(12) United States Patent
Emery et al.

(10) Patent No.: US 7,686,507 B2
(45) Date of Patent: Mar. 30, 2010

(54) MULTI-MODULE WEIGHING SYSTEM WITH TEMPERATURE CONTROL

(75) Inventors: Jean-Christophe Emery, Zürich (CH); Han-Rudolf Burkhard, Wila (CH)

(73) Assignee: Mettler-Toledo AG, Greifensee (CH)

( * ) Notice: Subject to any disclaimer, the term of this patent is extended or adjusted under 35 U.S.C. 154(b) by 83 days.

(21) Appl. No.: 11/984,039

(22) Filed: Nov. 13, 2007

(65) Prior Publication Data
US 2008/0121049 A1    May 29, 2008

(30) Foreign Application Priority Data
Nov. 24, 2006    (EP)    .................. 06124718

(51) Int. Cl.
*G01K 7/00*    (2006.01)
*G01K 3/00*    (2006.01)

(52) U.S. Cl. .................. 374/166; 374/141; 374/14; 374/110; 374/112

(58) Field of Classification Search .................. 374/166, 374/141, 112, 137, 14
See application file for complete search history.

(56) References Cited

U.S. PATENT DOCUMENTS

| 4,548,288 A | 10/1985 | Komoto |
|---|---|---|
| 7,339,122 B2 | 3/2008 | Burkhard |
| 2004/0245026 A1 | 12/2004 | Brighenti |
| 2006/0201719 A1 | 9/2006 | Burkhard |
| 2006/0207804 A1 | 9/2006 | Schilling et al. |

FOREIGN PATENT DOCUMENTS

| CA | 1 192 418 A1 | 8/1985 |
|---|---|---|
| EP | 0 846 940 A1 | 6/1998 |
| EP | 1 396 711 A1 | 3/2004 |
| EP | 1 698 872 A1 | 9/2006 |
| EP | 1 701 144 A1 | 9/2006 |
| JP | 2-24518 A | 1/1990 |
| JP | 2586115 B2 | 12/1996 |
| WO | WO 2004/099737 A1 | 11/2004 |

OTHER PUBLICATIONS

European Search Report.

*Primary Examiner*—Gail Verbitsky
*Assistant Examiner*—Mirellys Jagan
(74) *Attorney, Agent, or Firm*—Buchanan Ingersoll & Rooney PC

(57) ABSTRACT

Multi-module weighing system with a holding structure serving to receive a plurality of weighing modules which are rigidly connected to each other in a given spatial arrangement and are operable independently of each other, wherein each weighing module comprises at least one load receiver, wherein the multi-module weighing system is connected to a temperature control device which is in thermal connection with each of the weighing modules.

22 Claims, 4 Drawing Sheets

MULTI-MODULE WEIGHING SYSTEM WITH TEMPERATURE CONTROL

RELATED APPLICATION

This application claims priority under 35 U.S.C. §119 to European Patent Application No. 06124718.5 filed in the European Patent Office on Nov. 24, 2006, the entire contents of which are hereby incorporated by reference in their entireties.

TECHNICAL FIELD

A weighing system is disclosed with a plurality of weighing modules to weigh objects of a uniform nature, wherein the temperature of the weighing modules can be controlled.

BACKGROUND INFORMATION

An application for multi-module weighing systems is in automated production- and testing plants. Balances of a modular design—so-called weighing modules—are themselves particularly suitable for integration in these plants. In essence, these weighing modules are balances in which the display unit is arranged separately from the balance, for example in a system with a central display for a plurality of weighing modules. Areas of application for weighing modules of this type which are integrated in a system are installations for the production and testing of small, relatively expensive parts, for example filling- and packaging machines for tablets, capsules, vials, etc. in the pharmaceutical industry, or in the checking of ball bearings. The weighing of objects of the same kind or also the so-called batch-weighing are processes in which a plurality of material quantities have to be weighed individually within a compact space for purposes such as checking, dosage preparation, filling, etc.

Systems of this kind which are used to weigh objects of the same kind are known in the existing state of the art. They are configured primarily as linear or two-dimensional arrays of weighing modules. Other arrangements are based on a concept of placing the weighing modules in a two-dimensional arrangement like satellites around a linear arrangement of load receivers which will need to be adapted to the distances between the delivery elements of an existing transport conveyor device.

Other devices have compact weighing modules which are arranged at fixed intervals from each other in a shared holding structure, wherein the distance between them is kept as small as possible.

The weighing results as well as the reproducibility of an electronic balance or a weighing module are also influenced by the temperature of the weighing module. In the interest of reproducible weighings, it is therefore advantageous if each of the weighing modules arranged in a multi-module system has a substantially uniform operating temperature.

As the individual weighing modules in a multi-module weighing system are spaced very closely, this can cause a disadvantageous temperature distribution within the system, which can affect the reproducibility and repeatability of the weighing results of individual weighing modules and/or of the entire system.

In addition to the thermal effect that the weighing modules have on each other, fluctuations of the ambient temperature, in particular unexpected temperature peaks, can also have an influence on the zero-load indication, the reproducibility as well as other weighing parameters. Fluctuations of the ambient temperature in a production facility can be caused for example by machines being switched off, air-conditioning systems, radiation from the sun or other factors. However, especially in a production facility it is important for a balance to constantly be in a ready-to-operate condition without requiring long phases of adaptation to the ambient temperature while maintaining a uniform quality of the measuring results.

The state of the art in weighing technology offers a variety of cooled weighing compartments for a balance. The temperature control of the weighing compartment of a balance as disclosed in EP 1 396 711 B1 is achieved by using a temperature gradient which propagates along a vertical wall that is part of the stationary part of the balance and is connected to a thermoelectric module.

A balance with a weighing compartment is also disclosed in JP 2024518 A, wherein a heat pipe that is arranged in the housing part containing the electronics carries the heat being generated out of the housing to the outside, so that a temperature rise of the weighing compartment from the heat generated by the electronics is reduced.

In JP 2586115 B, a balance is disclosed whose weighing compartment is temperature-controlled by means of a thermoelectric module arranged in the weighing compartment in order to avoid convective air currents caused by opening the draft shield. This module is in thermal contact with a cooling plate which extends along the wall that separates the weighing compartment from the balance housing in which the electronics are enclosed or which is constituted by the separating wall itself. Its purpose is to keep the heat generated by the electronics of the balance from reaching the weighing compartment.

However, all of the foregoing solutions relate to balances with a single weighing cell, for example analytical balances, which have a weighing compartment enclosed by a draft shield. Usually, only the heat generated from the electronics of the balance is carried away or kept away from the weighing compartment, and no thermostatic temperature control nor a temperature adaptation to the ambient temperature is being performed. Especially an analytical balance is normally used in an environment whose atmospheric parameters are largely kept constant. In the case of an analytical balance it is therefore sufficient to switch the balance on with a certain lead time and to wait until the balance has reached its operating temperature or has taken on the ambient temperature.

SUMMARY

As an exemplary embodiment, a system is disclosed which comprises a holding structure configured in a multi-module weighing system to receive a plurality of weighing modules which are rigidly connected to each other in a given spatial arrangement and are operable independently of each other; a weighing module having at least one load receiver; and a device in thermal connection with the weighing module.

As another exemplary embodiment, a method of temperature control is disclosed. The exemplary method relates to temperature control of a multi-module weighing system with a holding structure serving to receive a plurality of weighing modules which are rigidly connected to each other in a given spatial arrangement and are operable independently of each other, wherein each weighing module comprises a load-receiving area and a load receiver. The multi-module weighing system is connected to a control- and/or regulation unit and comprises a temperature control device which is in thermal connection with each of the weighing modules, wherein the multi-module weighing system also comprises at least one first temperature sensor, and wherein at least one second temperature sensor is assigned to the multi-module weighing system. The exemplary method comprises the following steps:

a. measuring a first temperature of the ambient environment as a function of time by means of the first temperature sensor and the control- and regulation unit;
b. measuring at least one temperature of the multi-module weighing system as a function of time by means of the second temperature sensors and the control- and regulation unit;
c. determining a function which establishes a mathematical relationship between the measured temperatures and serves to control and/or regulate the heating- and/or cooling power of the temperature control device by means of the control- and/or regulation unit;
d. adjusting the heating- and/or cooling power of the temperature control device by means of the control- and/or regulation unit based on the function determined in step c.

BRIEF DESCRIPTION OF THE DRAWINGS

Several exemplary embodiments of a multi-module weighing device with temperature control capability are hereinafter explained in more detail by referring to the following drawings, wherein.

DETAILED DESCRIPTION

Figure 1:
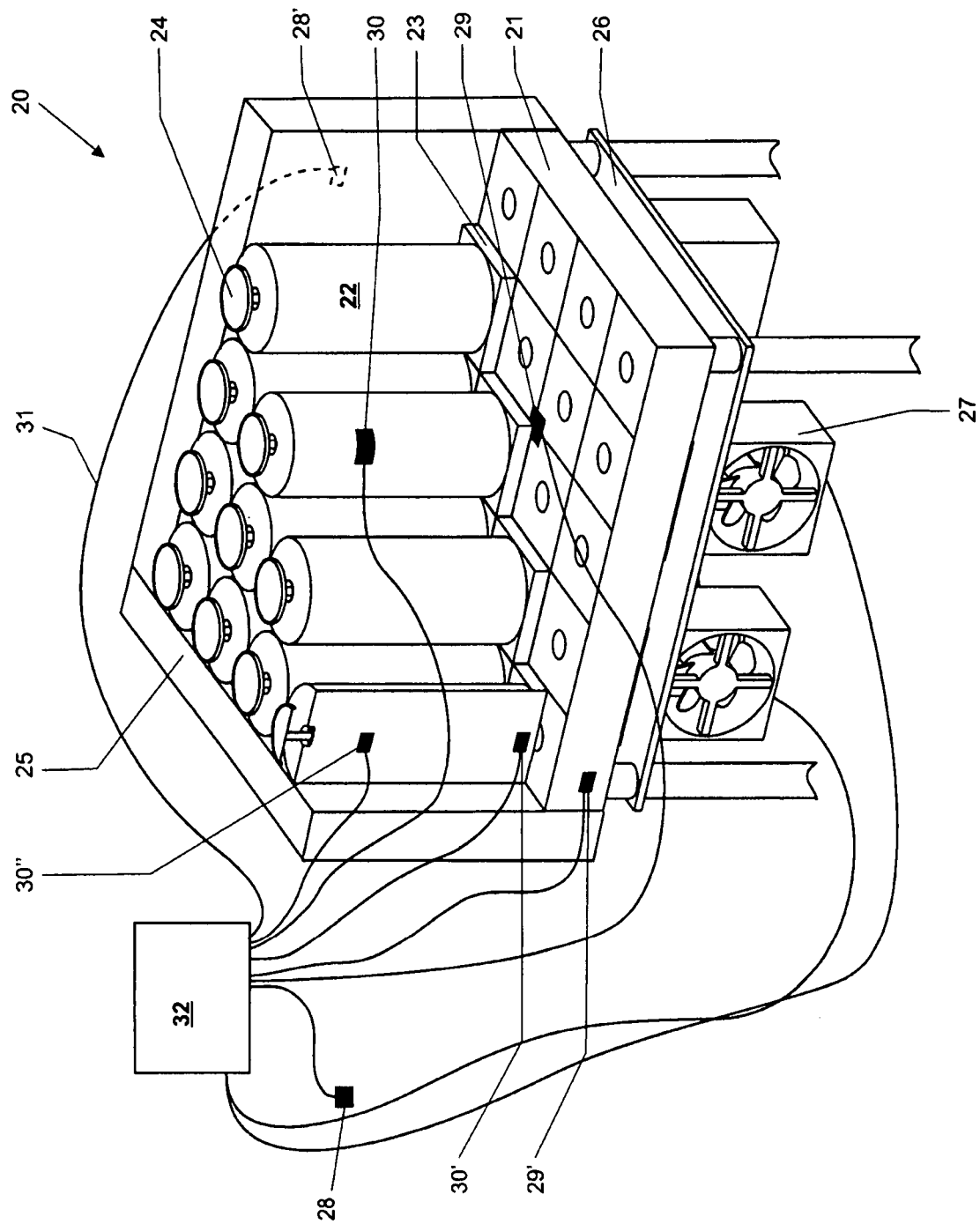
FIG. 1 represents a simplified three-dimensional drawing of a multi-module weighing system with several weighing modules, which is equipped with a plurality of temperature sensors and connected to a control- and/or regulation unit as well as to an air-cooled temperature control device.

In a multi-module weighing system, at least for the duration when the system is operating, the individual weighing modules can have a similar operating temperature and are thermally stabilized in relation to the ambient environment.

To ensure the thermal stability of the individual weighing modules of a multi-module weighing system and to improve the reproducibility or the repeatability of the measurement results of each individual weighing module, an exemplary multi-module weighing system is connected to a suitable temperature control device in order to compensate for temperature fluctuations as they occur. A system is disclosed which comprises a holding structure configured in a multi-module weighing system to receive a plurality of weighing modules which are rigidly connected to each other in a given spatial arrangement and are operable independently of each other; a weighing module having at least one load receiver; and a device in thermal connection with the weighing module.

The multi-module weighing system can be further connected to a control- and/or regulation unit, wherein the latter is connected to at least one first temperature sensor serving to measure the ambient temperature. Further, at least one second temperature sensor is assigned to the multi-module weighing system, serving to measure at least a second temperature associated with the multi-module weighing system. The control- and/or regulation unit is designed to control and to adjust the cooling- and/or heating power of the temperature control device based on the measured temperatures.

The control- and/or regulation unit is further designed to assign a time value to the measured temperature values of the first temperature sensor and/or the second temperature sensor.

With a multi-module weighing system that is configured in this way it is possible to adjust the operating temperature of the multi-module weighing system and/or of individual weighing modules to the ambient temperature and/or to regulate the operating temperature in such a way that the individual weighing modules, when they are in operation, have an essentially uniform temperature, whereby a better reproducibility or repeatability of the measurements of the individual weighing modules can be achieved.

The second temperature sensor can be arranged directly on the holding structure. If a single second temperature sensor is used, it is advantageous if the latter is arranged essentially at the center of the holding structure, because this allows the largest temperature difference relative to the ambient temperature to be determined and to be used in the temperature regulation.

In an exemplary embodiment, a plurality of second temperature sensors can be arranged at the holding structure, so that a multi-dimensional temperature profile of the multi-module weighing system can be determined as a function of time. This is particularly advantageous in a case where the temperature control device allows an independent temperature regulation of individual weighing modules or of a group of several weighing modules.

It is advantageous for an independent temperature regulation of the individual weighing modules if each weighing module has at least one third temperature sensor assigned to it, which can register for example the temperature in the interior of the weighing module and/or at the contact surface between the weighing module and a neighboring weighing module.

To determine the temperature and/or a multi-dimensional temperature profile of the multi-module weighing system, it is also possible to use temperature sensors that have been installed in the weighing modules already at the factory.

The temperature of the multi-module weighing system can be regulated by means of a shared temperature control device and/or by means of a temperature control device that includes a plurality of temperature control means. A temperature control means can in this case be thermally connected to an individual weighing module or to a group of weighing modules. The temperature control means of a multi-module weighing system constitute the temperature control device which is thermally connected to each weighing module of the multi-module weighing system. For temperature control means, one can use cooling elements and/or heating elements.

When a plurality of temperature control means are used, it is advantageous if the latter can be regulated independently of each other, so that temperature fluctuations can also be detected and compensated within the multi-module weighing system and/or between neighboring weighing modules.

For the temperature control of the multi-module weighing system, at least a base plate of the holding structure can be configured in such a way that it contains as a temperature control means at least one conduit for a heat exchanger fluid. The conduit is for example of a meandering shape and cooperates with a thermostat.

The temperature control means can be configured for example as a heat pipe, a Peltier element, an air-cooled element and/or as an element that cooperates with a temperature control fluid, wherein a temperature control device can include one or more temperature control means of the same and/or different types.

In a further example of an embodiment, the multi-module weighing system is shielded by at least one housing element against the ambient environment, wherein the housing element preferably constitutes an active and/or passive thermal insulation of the multi-module weighing system. A thermal separation of the multi-module weighing system from the ambient environment is advantageous for example if the system is used in a production plant, because it allows the influence of temperature fluctuations within the production line or even within a production building to be minimized.

In this exemplary embodiment it suggests itself to arrange the first temperature sensor, which serves to measure the ambient temperature, on the outside of the housing element.

A method of temperature control, i.e., controlling the temperature of a multi-module weighing system, includes several steps. The multi-module weighing system has a holding structure which serves as a seat for a plurality of weighing modules which are rigidly connected to each other in a given spatial arrangement and are operable independently of each other. Each weighing module has a load-receiving area, a load-receiver, and a force-compensation system. The multi-module weighing system is connected to a control- and/or regulation unit, to a temperature control device which is thermally connected to each weighing module, as well as to a first temperature sensor. Furthermore, there is at least one second temperature sensor associated with the multi-module weighing system.

To begin, a first temperature, the ambient temperature, is determined as a function of time by means of one or more first temperature sensors and the control- and/or regulation unit. Also, at least one second temperature of the multi-module weighing system is determined as a function of time by means of one or more second temperature sensors and the control- and/or regulation unit.

Next, based on the measured first and second temperature/ time data, a function can be determined which establishes a mathematical relationship between the measured temperatures. This function can be stored in a program or a memory unit of the control- and/or regulation unit. It serves the purpose of controlling and/or regulating the heating- and/or cooling power of the temperature control device by means of the control- and/or regulation unit. The regulation can take place in such a way that the second temperature is essentially made to agree with the first temperature or to follow the first temperature with a substantially constant offset, which is accomplished by adapting the heating- and/or cooling power of the temperature control device by means of the control- and/or regulation unit based on the function that was determined.

It is also conceivable that the heating- and/or cooling power of the temperature control device is regulated with a function that has been determined either empirically or theoretically. For example, recurrent time-dependent temperature phenomena, daily cycles and/or day/night cycles, such as for example the start-up profile of an air-conditioning system, could be considered as a basis for the temperature control of the multi-module weighing system.

In order to achieve a uniform quality of the weighing results it may be sufficient, depending on the area of application for the multi-module weighing system, to determine at least the first and the second temperature once before the beginning of a measurement cycle and then to set a substantially uniform rate of heating- and/or cooling. For areas of application where the ambient temperature fluctuates strongly or where sudden temperature peaks occur, it suggests itself to repeat the aforementioned steps at fixed time intervals and to readjust the operating temperature of the multi-module weighing system continuously or at specified times on the basis of the function that was determined.

The mathematical function determined in the step described above can have the form of a simple difference between an actual ambient temperature and an actual temperature of the multi-module weighing device, or it can also represent a functional mathematical relationship between the actual ambient temperature and the actual temperatures of one or more individual weighing modules, so that the temperatures of one or more individual weighing modules are set and/or regulated independently of each other. It is further possible to store a given function or a set-point temperature in the control- and/or regulation unit and use it for the regulation of the heating- and/or cooling rate of the temperature control device.

The second and/or third temperature sensors can also be used to monitor the temperature of the multi-module weighing system and/or one or more of the weighing modules. If the measured temperature lies outside of a given operating temperature, the control- and/or regulation unit generates a warning signal.

Ideally, it is possible that all weighing modules are regulated by means of the temperature control device to a substantially uniform operating temperature, so that an essentially uniform spatial temperature profile establishes itself.

In addition, a temperature control device according to the invention offers the possibility to heat the multi-module weighing system, for example in order to bring it rapidly to a substantially constant operating temperature.

In FIG. 1, a multi-module weighing system 20 is shown in a simplified representation. The multi-module weighing system 20 has a holding structure 21 for up to twenty weighing modules 22, ten of which can be seen in the drawing. Each weighing module 22 is connected to the holding structure 21 through a kind of socket 23 and has a load receiver 24. The load receiver 24 is connected through a suitably configured linkage to a weighing cell (not shown in the drawing) which is arranged inside the weighing module 22. As indicated in FIG. 1, the multi-module weighing system 20 can be insulated against the ambient environment, in particular with regard to temperature, by means of at least one housing element 25, two of which can be seen in the drawing. It is also possible that the multi-module weighing system 20 is surrounded on all sides by housing elements 25. The housing elements 25 protect the multi-module weighing system 20 against thermal influences as well as for example against pollution. In their simplest form, the housing elements 25 consist of an insulating material, but it is also possible to actively cool or heat the housing elements 25. This can be accomplished by similar means as will be described hereinafter for the temperature control of a multi-module weighing system.

Arranged below the holding structure 21 is a further carrier structure 26, on which several temperature control means are arranged in the form of air-cooled elements 27. The carrier structure 26 is connected to the holding structure 21 in such a way that the propagation of shocks and vibrations from the carrier structure 26 to the holding structure 21 is avoided as much as possible.

For air-cooled elements 27, it is possible to use for example commercially available CPU fans or other cooling devices, as indicated in the drawing by the ventilation fans. The primary purpose of the air-cooled elements 27 is to remove the heat generated in the multi-module weighing system and carry it to the outside. Each air-cooled element 27 is connected to the control- and/or regulation unit 32, which regulates the temperature of the multi-module weighing system 20 mostly by slowing down and/or speeding up the spinning of the rotors of the air-cooled elements 27.

To measure the ambient temperature as well as the temperature of the multi-module weighing system 20, the latter has at least one first temperature sensor 28, 28' and at least one second temperature sensor 29, 29'. Further, at least one third temperature sensor 30, 30', 30" can be arranged at the multi-module weighing system 20. Each temperature sensor 28, 28', 29, 29', 30, 30', 30" is connected to the control- and/or regulation unit 32 through a suitable wired or wireless connection 31, examples of which are shown in the drawing in the form of wired connections.

A first temperature sensor 28 for measuring the ambient temperature has no thermal contact to the multi-module weighing system 20. As an alternative or in addition, a further first temperature sensor 28' can be arranged for example on the outside of a housing element 25.

The space between the holding structure 21 and the carrier structure 26 can in addition be used as a cable duct, for example for the electric connections and conduits of the individual weighing modules 22, the air-cooled elements 27 and/or the temperature sensors 28, 28', 29, 29', 30, 30', 30".

One or more second temperature sensors 29, 29' are connected to the holding structure 21 to measure the temperature of the multi-module weighing system 20. The second temperature sensors 29, 29' can be arranged at any desired location of the holding structure. It is advantageous to arrange a second temperature sensor 29 approximately at the center, because due to the tightly spaced arrangement of the weighing modules, this is where the largest deviation from the ambient temperature is to be expected.

Further third temperature sensors 30, 30', 30" are arranged at and/or in a weighing module 22. It is possible to arrange weighing modules 22 with or without third temperature sensors 30, 30', 30" in the holding structure 21.

The multi-module weighing system 20 can be equipped with all or only a part of the temperature sensors 28, 28', 29, 29', 30, 30', 30" that are shown in FIG. 1, as long as there is at least one first temperature sensor 28, 28' for measuring the ambient temperature and at least one second temperature sensor 29, 29' and/or third temperature sensor 30, 30', 30" for measuring the temperature of the multi-module weighing system 20. The locations of the sensors 28, 28', 29, 29', 30, 30', 30" which are shown in the drawing are meant as examples. A multi-module weighing system according to the disclosure can have sensors in addition to those shown in the drawings and/or sensors arranged at other locations.

Figure 2:
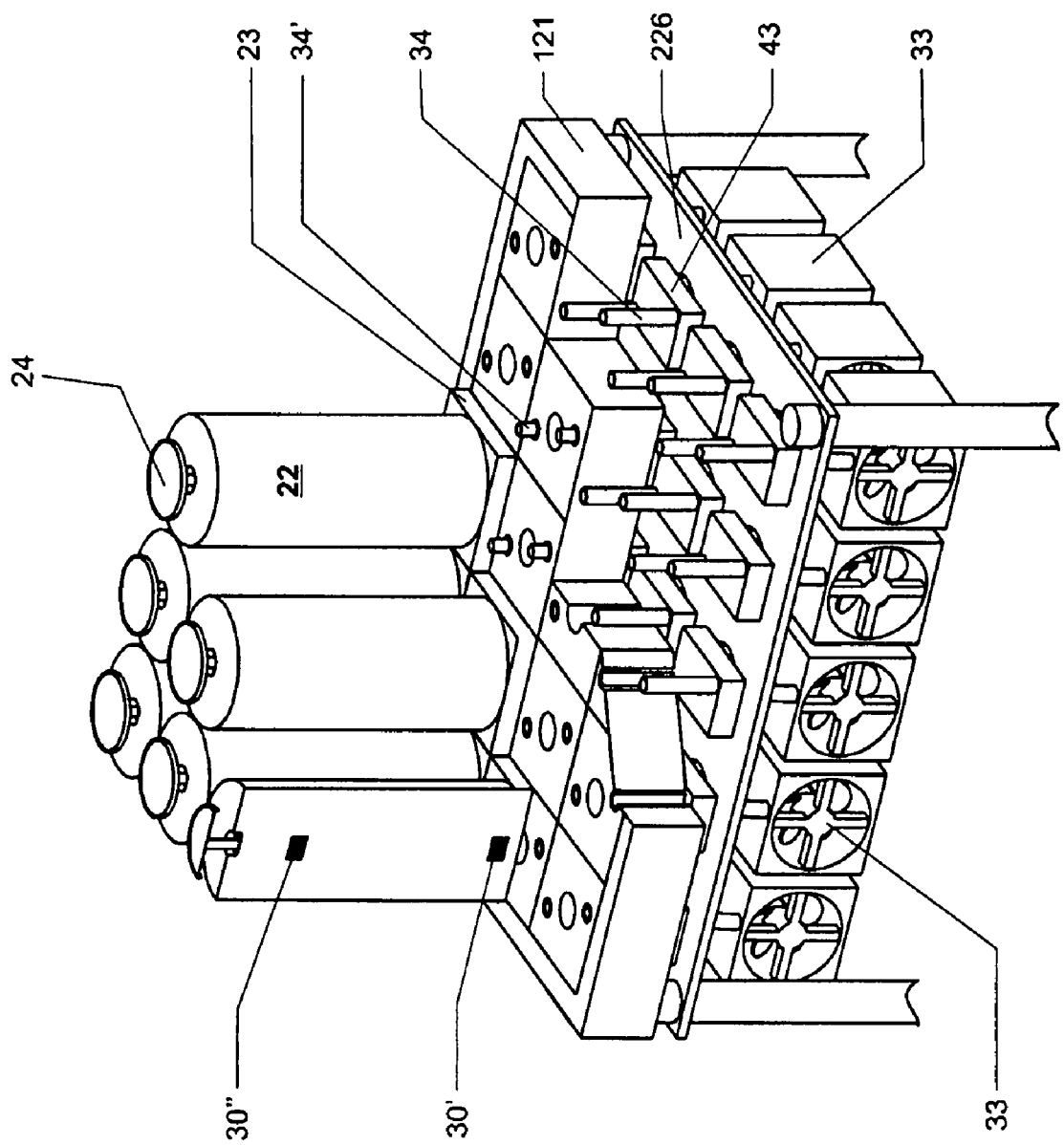
FIG. 2 represents a simplified three-dimensional view, drawn partially in break-away form, of a multi-module weighing system with several weighing modules, wherein the temperature control device comprises heat pipes and air-cooled elements as temperature control means and each weighing module is connected to at least one temperature control means.

FIG. 2 shows a multi-module weighing system in which each weighing module 22 is connected directly to a separate temperature control means which in this case has the form of two heat pipes 34, 34' which, in turn, are connected to a further temperature control means in the form of a cooling element 33. To give an example, the cooling element 33 is represented as a fan, but it is also possible to use other known cooling elements to carry away the heat. The heat pipes 34, 34' are connected through suitably designed connecting sockets 43 to the carrier structure 226 and/or the holding structure 121. The heat pipes 34 can either be arranged only in the receiving structure 121, or they can reach into the weighing modules as is also shown for the heat pipes 34' in FIG. 2, so that they are in direct thermal contact with the weighing modules 22.

The heat pipes 34, 34' and the cooling elements 33 are combined into a temperature control device which can be controlled by way of a control- and/or regulation unit (as shown in FIG. 1, but not in FIG. 2) dependent on the temperature values determined by way of the temperature sensors (see also FIG. 1). In the exemplary embodiment which is shown here as an example, the temperature of an individual weighing module 22 can be separately controlled and regulated through the directly connected heat pipes 34, 34' and the cooling medium 33. This makes it possible to essentially compensate for temperature influences coming from the outside as well as for the thermal influence that the individual weighing modules 22 have on each other, and to ensure that each individual weighing module 22 operates essentially with a constant, uniform temperature/time profile.

Figure 3:
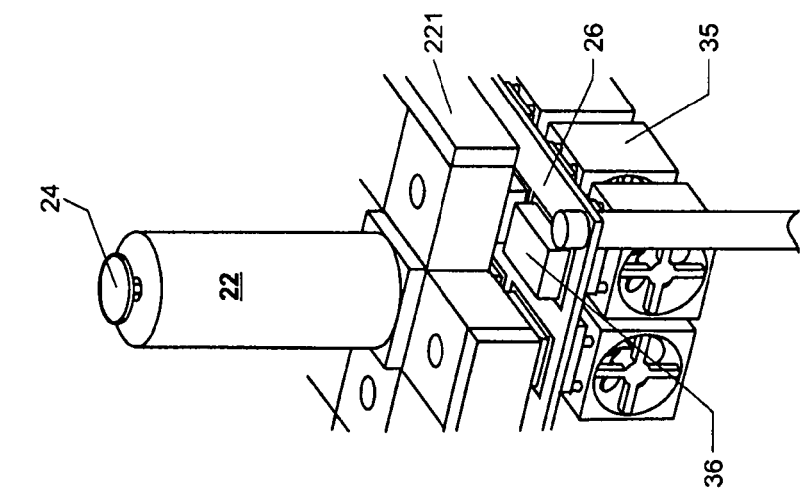
FIG. 3 represents a detail of a multi-module weighing system in a simplified three-dimensional view, wherein the weighing system is connected to a temperature control device in which the temperature control means comprise Peltier elements connected to cooling elements.

A further type of a temperature control device is illustrated in FIG. 3, wherein the latter shows only a detail of a multi-module weighing system with a holding structure 221 that serves as a seat for weighing modules 22. The temperature control device includes temperature control means in the form of Peltier elements 36 that are connected to cooling elements 35. The temperature of the individual weighing modules 22 is regulated or set by way of the Peltier elements 36, and the heat generated by the weighing modules is carried away by the cooling elements 35. As shown here, there can be a Peltier element 36 assigned to each weighing module 22. It is also possible that a Peltier element 36 is thermally connected to a group of weighing modules 22. The Peltier elements 36 are arranged between the cooling elements 35 and the carrier structure 221. All of the Peltier elements 36 as well as all of the cooling elements 35 are connected to the control- and/or regulation unit (not shown in this drawing) which controls and regulates the cooling- and/or heating power of the temperature control device on the basis of the measured temperature values.

Figure 4:
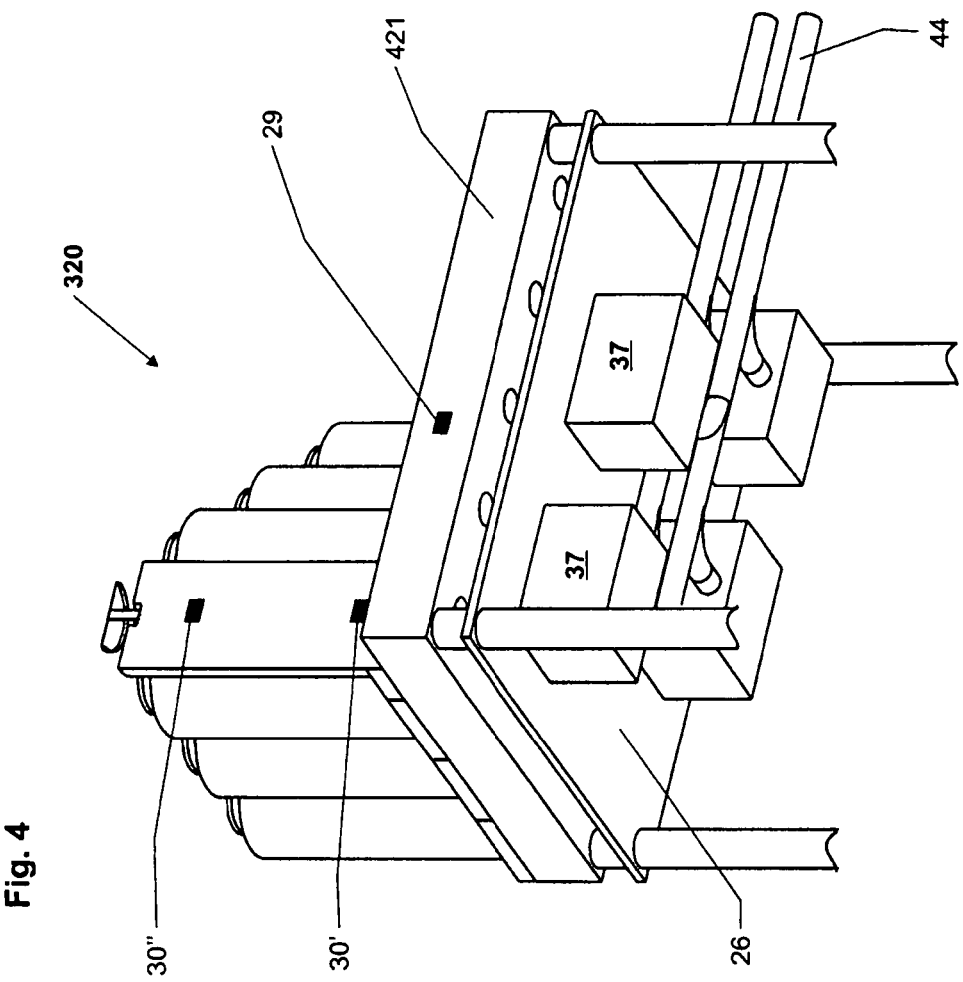
FIG. 4 represents a simplified three-dimensional drawing of a multi-module weighing system with temperature control capability which is connected to a temperature control device wherein the temperature control means comprise heat exchangers that are supplied with temperature control fluid.

As a further exemplary embodiment of the disclosure, FIG. 4 shows a temperature control device in which the heating or cooling is provided by a temperature control fluid. The multi-module weighing system 320 is connected to a plurality of fluid-filled heat exchangers 37. As a fluid, one could for example use water or other known heat-exchange fluids in liquid or gas form. The exchange as well as the temperature control of the fluid takes place by way of the inlet- and/or outlet conduit 44 connected to the heat exchangers 37, which are connected for example to a suitable thermostat and/or cryostat.

Figure 5:
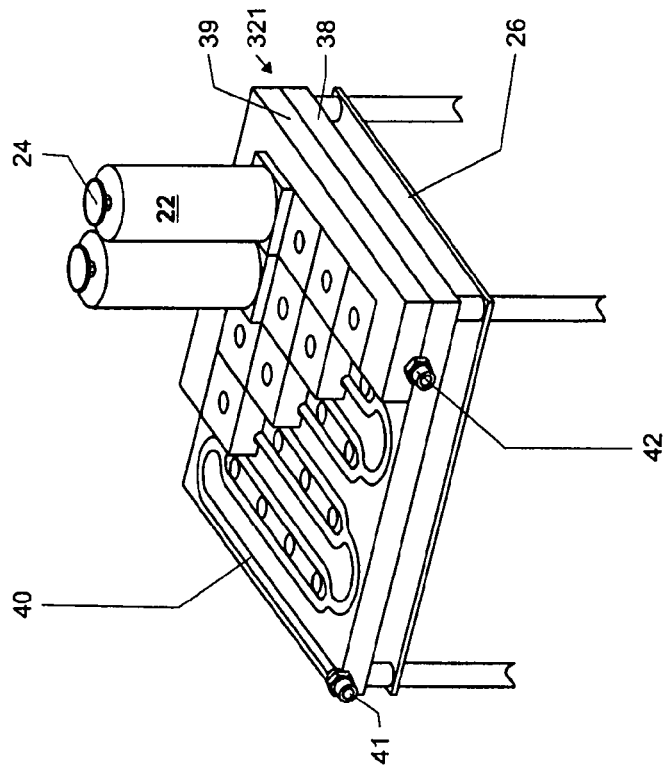
FIG. 5 represents a simplified three-dimensional view, drawn partially in break-away form, of a multi-module weighing system, with a holding structure for a plurality of weighing modules, wherein at least one component structure of the holding structure comprises a meander-shaped conduit for temperature control fluids as a temperature control means.

Besides the arrangement shown in FIG. 4 for the temperature control device, it is also possible to incorporate the temperature control device in the holding structure 321 of the multi-module weighing device, as is illustrated in FIG. 5. The holding structure 321 is configured in two parts, with a meander-shaped conduit 40 being laid out as a temperature control means in at least one of the component structures 38, 39 of the holding structure 321. The component structures 38, 39 are connected to each other in such a way that the conduit 40 is sealed tight, so that heat transfer fluid in the conduit 40 can flow into and out of the conduit 40 only though the two connectors 41, 42. The heat exchange fluid is kept at a controlled temperature by means of an external thermostat and/or cryostat (not shown here) which is connected to the connectors 41, 42 and is circulated in the conduit 40 for example by means of a suitable pump which can be part of the thermostat and/or cryostat. The conduit 40 is configured in a meandering shape, for which the shape in FIG. 5 represents a possible example. The conduit 40 can have any desired shape.

By means of the temperature values measured by the temperature sensors and by means of the control- and/or regulation unit, the temperature control devices illustrated in FIGS. 1 to 5 can adjust the dynamic and/or spatial temperature profile of the multi-module weighing system to an ambient temperature or, of course, also to any prescribed temperature. Normally, heat is generated during the operation of a multi-module weighing system, which needs to be carried away by means of the temperature control device. In principle, each of the temperature control devices presented also has the capability to heat a multi-module weighing system, should the latter be used for example in a low-temperature environment.

The temperature control devices presented here can be connected to any multi-module weighing systems. A temperature control device can employ temperature control means of one uniform kind and/or of different kinds, wherein the temperature control means can be configured as pure cooling means, pure heating means and/or combined heating/cooling means. FIGS. 1 to 5 show examples of a few temperature control means, but it is of course also possible to use other state-of-the-art temperature control means.

Figure 6:
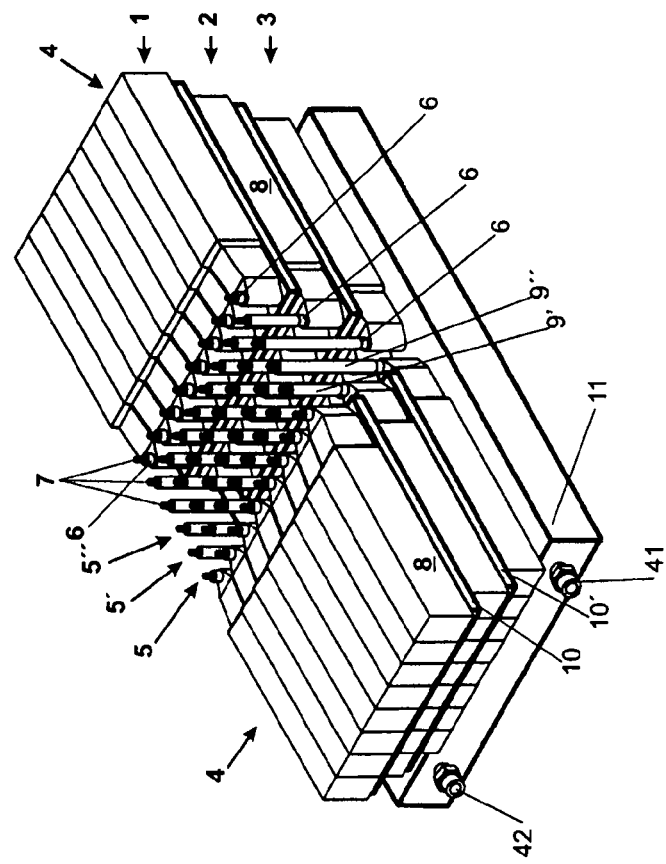
FIG. 6 represents a simplified three-dimensional drawing of a multi-module weighing system, which can be temperature controlled, with weighing modules that are arranged on several different levels and with a temperature control device.

FIG. 6 represents a three-dimensional illustration of a multi-module weighing system for the weighing of uniform weighing objects, which is composed of a total of forty-eight individual weighing modules 4. These are arranged in three levels 1, 2, 3 above each other, forming in each of the levels 1, 2, 3 two parallel rows of weighing modules 4, wherein the weighing modules 4 of the first level 1 have a translatory offset in their lengthwise direction against those of the second level 2. The weighing modules 4 of the type illustrated here are very long in comparison to their width.

Each of the weighing modules has a load receiver 5, 5', 5", with the load receivers 5, 5', 5" being arranged at regular intervals from each other. A load receiver 5, 5', 5" includes at least one force-transmitting rod as well as a load carrier, wherein the load carrier is connected by means of a force-transmitting rod (not visible in the drawing) to the load-receiving part of a weighing cell (likewise not shown in the drawing) inside the housing 8 of each weighing module 4. The load carriers in FIG. 6 are indicated by seating bolts 7 forming the ends of the force-transmitting rods. A load carrier or weighing pan of any desired kind can be set on the seating bolt 7—provided that the dimensions of the load carrier or weighing pan are smaller than the distance between neighboring load receivers 5, 5', 5".

The load receivers 5', 5" connected to the weighing modules of the second level 2 and the third level 3 are lengthened in comparison to those of the first level 1, so that all of the seating bolts 7 or the weighing pans attached to them are aligned in a plane that runs orthogonal to the direction of gravity.

The weighing modules of each row of a level are attached to a respective carrier platform 10, 10'. In this arrangement, the carrier platform 10 separates the first level 1 from the second level 2, while the carrier platform 10' separates the second level 2 from the third level 3. A base plate 11, which is in this case configured as one uninterrupted plate, supports the entire structure of the system for the weighing of uniform objects. The carrier platforms 10, 10' are connected to the base plate 11 in a conventional manner not specifically described here, in order to lend the required degree of stability to the entire weighing system for uniform objects.

The housing 8 of each weighing module 4 has a narrowing, tapered shape at the end towards the load receiver 5, 5', 5". This offers the possibility that the weighing modules 4 could also be arranged differently to form a matrix array of the load carriers.

Each of the carrier platforms 10, 10' and/or the base plate 11 can be connected to one of the temperature control devices shown in FIGS. 1 to 5. As a temperature control means for the multi-module weighing system shown here, it suggests itself in particular to provide one or more of the carrier platforms 10, 10' and/or, as shown here as an example, the base plate 11 with a meander-shaped conduit of the kind illustrated in FIG. 5 to conduct heat transfer fluids. In FIG. 6, two connectors 41, 42 can be seen, which are connected to a meander-shaped conduit inside the base plate 11.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 first level
2 second level
3 third level
4 weighing module
5, 5', 5" load receiver
6 base element
7 seating bolt
8 housing of the weighing module
9, 9' sleeve
10, 10' carrier platform
11 base plate
20, 320 multi-module weighing system
21, 121, 221, 321, 421 holding structure
22 weighing module
23 socket
24 load receiver
25 housing element
26 carrier structure
27 air-cooled element
28, 28' first temperature sensor
29, 29' second temperature sensor
30, 30', 30" third temperature sensor
31 connection
32 control- and/or regulation unit
33 air-cooled element
34, 34' heat pipe 35 cooling element
36 Peltier element
37 heat exchanger
38 component structure of 321
39 component structure of 321
40 conduit
41 connector
42 connector
43 connecting socket
44 inlet- and/or outlet conduit

What is claimed is:

1. System comprising:
   a holding structure configured in a multi-module weighing system to receive a plurality of weighing modules which are rigidly connected to each other in a given spatial arrangement and are operable independently of each other, at least one of the plurality of the weighing modules having at least one load receiver; and
   a temperature control device in thermal connection with the at least one weighing module for adjusting a temperature within the at least one weighing module.

2. The system according to claim 1, wherein the holding structure comprises a base plate in which at least one conduit is formed for a heat exchanger fluid and said conduit cooperates with the temperature control device.

3. The system according to claim 1, wherein the temperature control device comprises at least one heat pipe as a temperature control means.

4. The system according to claim 1, wherein the temperature control device comprises at least one Peltier element as a temperature control means.

5. The system according to claim 1, wherein the temperature control device as a temperature control means comprises at least one temperature control element that is temperature controlled by air and/or fluid.

6. The system according to claim 1, wherein a control- and/or regulation unit is configured to assign a time value to the measured temperature values of a first temperature sensor for measuring the ambient temperature and of a second temperature sensor assigned to the multi-module weighing system.

7. The system according to claim 1, wherein the temperature control device comprises a plurality of temperature control means.

8. The system according claim 7, wherein one or more of said temperature control means can be regulated separately from each other.

9. The system according to claim 1, wherein the multi-module weighing system is connected to a control- and/or regulation unit which is connected to at least one first temperature sensor for measuring the ambient temperature,
   wherein there is at least one second temperature sensor assigned to the multi-module weighing system, wherein said control- and/or regulation unit is configured for controlling cooling- and/or heating power of the temperature control device with the measured temperature values of the first temperature sensor and the second temperature sensor.

10. The system according to claim 9, wherein the control- and/or regulation unit is configured to assign a time value to the measured temperature values of the first temperature sensor and of the second temperature sensor.

11. The system according to claim 9, wherein the second temperature sensor is arranged at the holding structure.

12. The system according to claim 9, wherein there is at least one third temperature sensor assigned to each weighing module.

13. The system according to claim 9, wherein there is at least one third temperature sensor assigned to each weighing module.

14. The system according to claim 9, wherein at least one housing element shields the multi-module weighing system against the ambient environment, wherein the housing element constitutes an active or passive thermal insulation.

15. The system according to claim 14, wherein the first temperature sensor is arranged outside of the at least one housing element.

16. Method of temperature control of a multi-module weighing system with a holding structure serving to receive a plurality of weighing modules which are rigidly connected to each other in a given spatial arrangement and are operable independently of each other, wherein each weighing module comprises a load-receiving area and a load receiver, wherein the multi-module weighing system is connected to a control- and/or regulation unit and comprises a temperature control device which is in thermal connection with each of the weighing modules, wherein the multi-module weighing system also comprises at least one first temperature sensor, and wherein at least one second temperature sensor is assigned to the multi-module weighing system, wherein the method comprises the following steps:
   a. measuring a first temperature of the ambient environment as a function of time using the first temperature sensor and the control- and regulation unit;
   b. measuring at least one temperature of the multi-module weighing system as a function of time using the second temperature sensor and the control- and regulation unit;
   c. determining a function which establishes a mathematical relationship between the measured temperatures and serves to control and/or regulate heating- and/or cooling power of the temperature control device using the control- and/or regulation unit; and
   d. adjusting the heating- and/or cooling power of the temperature control device using the control- and/or regulation unit based on the function determined in step c.

17. Method according to claim 16, wherein in step b, a multi-dimensional temperature profile of the multi-module weighing system is determined as a function of time by means of the second temperature sensors.

18. Method according to claim 16, wherein the steps a to d are repeated in regular prescribed time intervals.

19. Method according to claim 16, wherein the steps a to d are repeated continuously when the multi-module weighing system is in a ready-to-operate condition.

20. Method according to claim 16, wherein at least one third temperature sensor is assigned to each weighing module and that the temperature of each individual weighing module is regulated in relation to the ambient temperature.

21. Method according to claim 16, wherein all of the weighing modules are regulated by means of the temperature control device to a substantially uniform operating temperature, so that a substantially uniform spatial temperature profile establishes itself.

22. A control- and/or regulation arrangement for a multi-module weighing system with a holding structure serving to receive a plurality of weighing modules which are connected but independently operable in a given spatial arrangement, each weighing module having at least one load receiver, the arrangement comprising:
   a control- and/or regulation unit connected to the multi-module weighing system;
   at least one first temperature sensor for measuring the ambient temperature, connected to the control- and/or regulation unit;

a temperature control device for the weighing modules; and at least one second temperature sensor assigned to the multi-module weighing system, wherein said control- and/or regulation unit is configured for controlling and for adjusting the temperature control device based on the measured temperature values of the at least one first temperature sensor and the at least one second temperature sensor.

* * * * *